(12) United States Patent
Murin

(10) Patent No.: US 7,185,558 B2
(45) Date of Patent: Mar. 6, 2007

(54) GEARED SEGMENTS WITH VARIABLE GEAR RATIO

(76) Inventor: Peter Murin, Ďurďošik 15, 04445 (SK)

( * ) Notice: Subject to any disclaimer, the term of this patent is extended or adjusted under 35 U.S.C. 154(b) by 302 days.

(21) Appl. No.: 10/772,751

(22) Filed: Feb. 4, 2004

(65) Prior Publication Data

US 2004/0154434 A1    Aug. 12, 2004

(30) Foreign Application Priority Data

Feb. 5, 2003    (SK) .................................. 21-2003 U

(51) Int. Cl.
*F16H 33/00*   (2006.01)
*F16H 35/00*   (2006.01)
*F16H 37/00*   (2006.01)

(52) U.S. Cl. .................... 74/640; 74/397; 475/170

(58) Field of Classification Search ............... 475/163, 475/169, 170; 74/640, 665 R, 392, 390, 74/395–397
See application file for complete search history.

(56) References Cited

U.S. PATENT DOCUMENTS

| | | | | |
|---|---|---|---|---|
| 2,245,280 A | * | 6/1941 | Kammer | ...................... 475/14 |
| 2,728,277 A | * | 12/1955 | McRae | ........................ 404/117 |
| 3,433,311 A | * | 3/1969 | Lebelle | ........................ 173/49 |
| 3,678,766 A | * | 7/1972 | Geber | ........................... 74/23 |
| 4,756,203 A | * | 7/1988 | Matsuda | ..................... 74/84 R |

FOREIGN PATENT DOCUMENTS

GB    2259741 A  *  3/1993

* cited by examiner

*Primary Examiner*—Tisha Lewis
(74) *Attorney, Agent, or Firm*—Donn K. Harms

(57) ABSTRACT

A variable gear ratio device featuring geared segments with variable gear ratio adapted for inclusion into mechanical machines, motors and pumps where there is a constant requirement for a variable transfer ratio for the variability and optimization of the load of torque that are formed by a driving shaft and driven shaft. The device features a plurality of engaged gears capable of eccentric rotation where the axis of rotation of the driven shaft is moved outside of the center axis of the driving eccentric geared segment.

4 Claims, 3 Drawing Sheets

GEARED SEGMENTS WITH VARIABLE GEAR RATIO

FIELD OF THE INVENTION

This application claims the benefit of Slovak Republic (Slovakia) Application No. PÚV 21-2003, filed Feb. 5, 2003. The technical solution herein disclosed relates to geared segments with variable transfer ratio determined mainly in mechanical machines, motors and pumps, where provision of a variable transfer ratio during one revolution is desirable.

BACKGROUND OF THE INVENTION

Until now there are known mechanical, electrical, pneumatic, hydraulic, magnetic and combined gears that transfer the motion and mechanical power from one shaft to another shaft while one pair of geared wheels (cog wheels) performs a movement that has a constant transfer ratio given by the ration of the number of teeth of wheels. The disadvantage of these given technical solutions is that there is a constant transfer ratio where provided by the meshing one or two pairs of teeth of co-engaged wheels and optimum efficiency is not provided.

Another known solution is a transfer facility according to invention's description to applicant's certificate no. 223 064 is formed by a box of facility, equipped with a geared crown wheel co-engaged (meshed in) with a gearing freely placed pinion, firmly connected with the outlet shaft. Though it is possible to achieve with the given transfer facility high gear ratios of revolutions by one pair of geared wheels (cog wheels), the disadvantage of the above solution is the fact that the driving and driven shaft are in one axis, the transfer ratio is constant and thus does not provide optimum efficiency of the facility.

Another known solution is the transfer equipment with a changeable gear ratio according to the patent documentation no. 281 220 that mainly relates to motor vehicles that contain between the input and output, a differential mechanism that has three inputs. The disadvantage of the given solution is the high price, heavy weight, low efficiency and great complexity, especially if it contains a greater number of geared wheels with various transfer (gear) ratios as required by current industrial trends.

Though the latest gear ratios contain a mechanism for direct meshing that start to work when the motor vehicle reaches a certain average driving speed, to remove at this stage the losses in the exchanger (transmission or converter), the above given mechanisms that are very complex, do not solve the issue connected with high power losses caused by the converter at low speeds.

From U.S. Pat. No. 3,426,618 is further also known an equipment whose input drives communicate directly through the torque converter and reduction gear with the second input of gear mechanism. This results in the fact that there goes through a the converter only a certain part of power and thus the losses in the converter can be decreased. The disadvantage of this technical solution is a relatively complex and large gear mechanism.

The object of the technical solution of the device herein disclosed, is to create a gear mechanism with a variable gear ratio of given type, in a simple manner having minimal parts.

SUMMARY OF THE INVENTION

The given shortages are in a great extent eliminated by geared segments with variable transfer (gear) ratio aimed mainly for use in mechanical machines, motors and pumps where there is a constant requirement for a variable transfer ratio for the variability and optimization of the load of torque that are formed by a driving shaft and driven shaft. This is based on the fact that there is placed on the driving shaft in the axis of rotation a collapsible driving eccentric geared segment with a driving gear mechanism that is formed of at least three driving teeth from which at least one of them is meshed with minimum one driving teeth of external driving gear mechanism that is formed on the periphery of co-engaged (meshed) driven eccentric geared mechanism while in the driven eccentric geared mechanism is in the axis of rotation placed the driven shaft.

It is an advantage that the number of the teeth (cogs) of driving eccentric geared segment is identical with the number of teeth of driven eccentric geared segment.

Further, it is also advantageous, that the axis of rotation of the driven shaft is moved outside of the center axis of driving eccentric geared segment and the axis of rotation of the driven shaft is moved outside of the center axis of the driven eccentric geared segment.

Further objects of the invention will be brought out in the following part of the specification, wherein detailed description is for the purpose of fully disclosing the invention without placing limitations thereon.

BRIEF DESCRIPTION OF THE DRAWINGS

The technical solution in this disclosure will be more closely explained with the help of drawings where FIG. 1 are schematically depicted geared segments with variable transfer (gear) ratio

DETAILED DESCRIPTION OF THE PREFERRED EMBODIMENTS OF THE INVENTION

Figure 1:
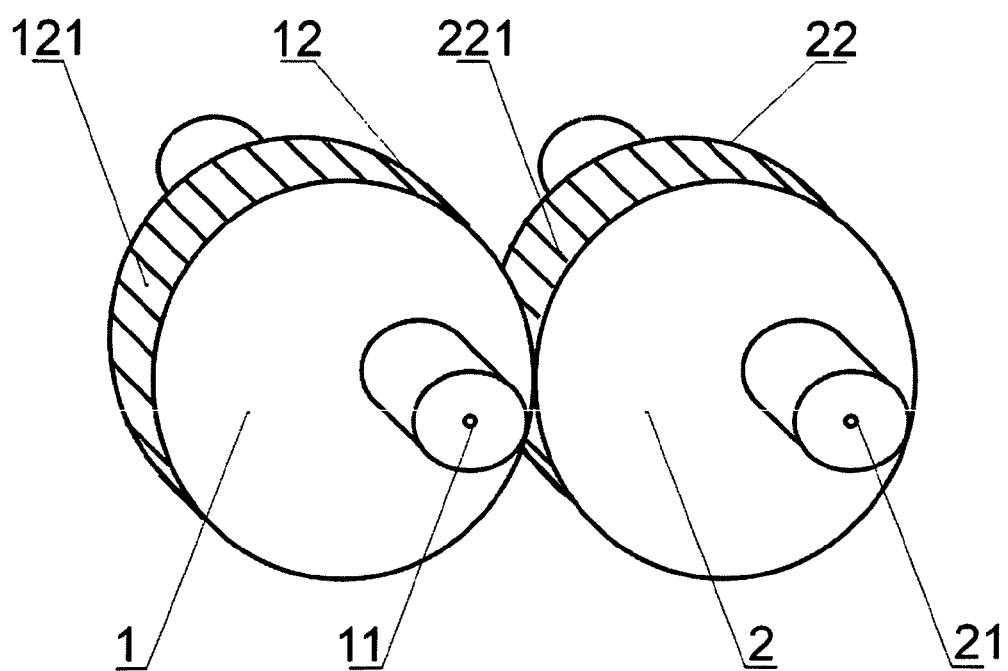
Figure 2:
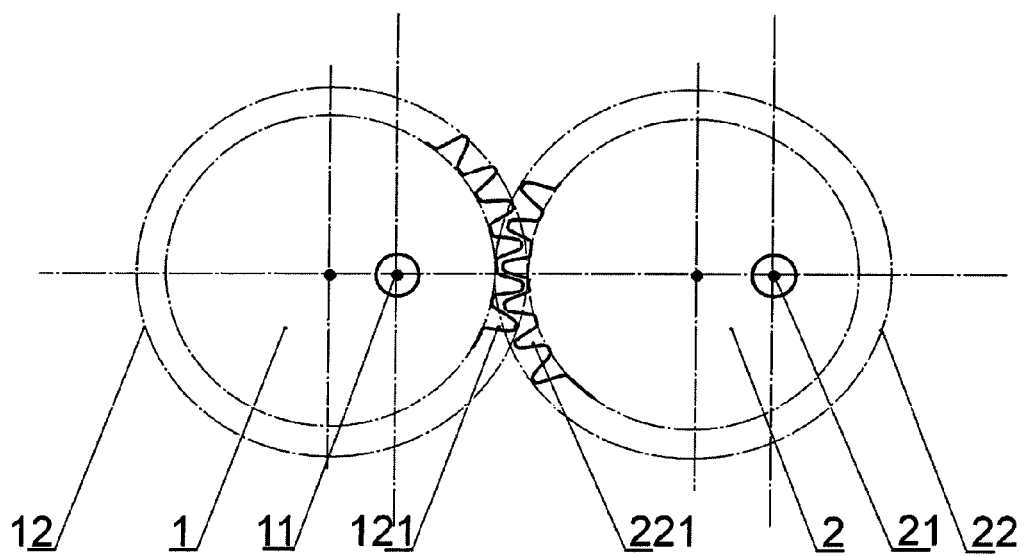
FIG. 2 is a spatial depiction of geared segments with variable transfer (drive) ratio
Figure 3:
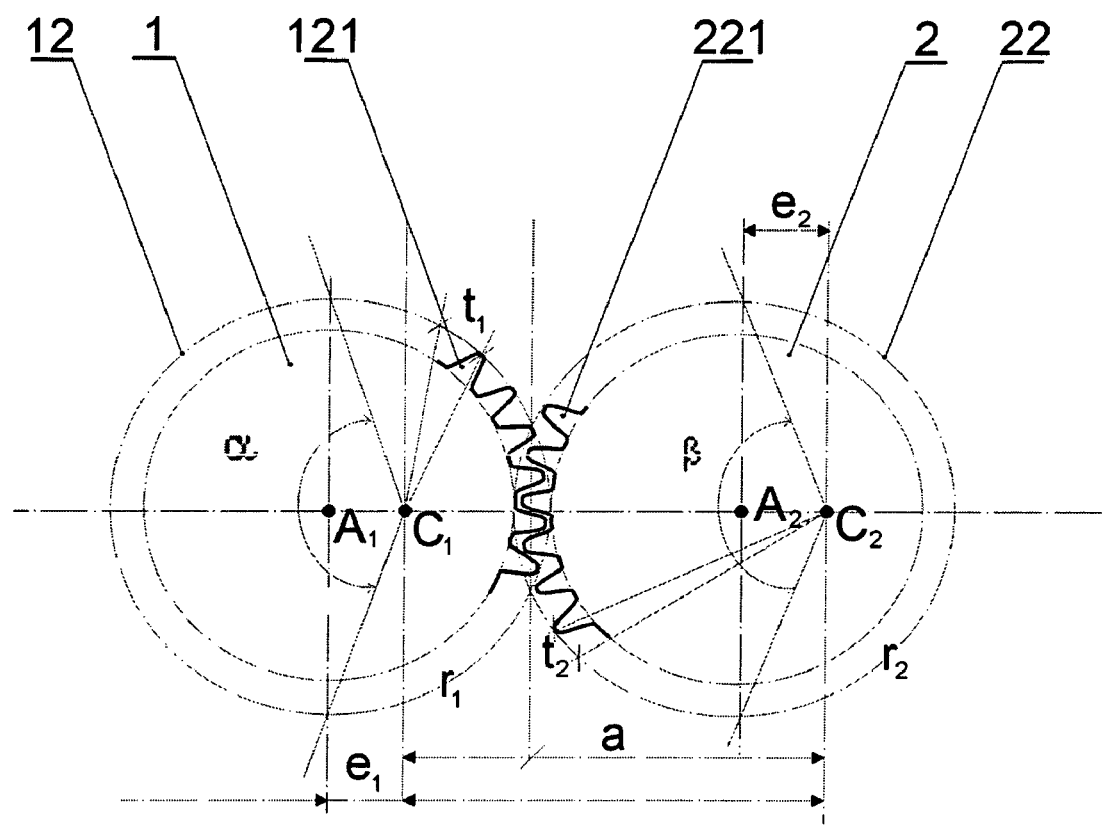
FIG. 3 is schematically depicted the illustration of the mesh of geared segments with parameters.

Referring now to the drawings, FIGS. 1–3 depict the disclosed device, the disclosed device as depicted in FIG. 1 is made from a driving shaft 11 where is placed a collapsible driving eccentric geared segment 1, that is placed in the axis of rotation. The axis of rotation of the driving shaft 11 is located outside of the center axis of the driving eccentric geared segment 1. On the periphery of driving eccentric geared segment 1 is created an external driving gearing 12 that is formed of driving teeth 121 that have various shapes and sizes. The driving teeth 121 of the external driving gearing 12 are meshed with the driven teeth 221 of the external driven gearing 22, while there is a constant axial distance between the axis of rotation of the driving shaft 11 and axis of rotation of driven shaft 21. The module m of driven teeth 221. The spacing (distance) t of driving teeth 121 is identical with the spacing t of driven teeth. The external driven gearing 22 is formed on the periphery of co-engaged (meshed) driven eccentric geared segment 2. In the axis of rotation of driven eccentric geared segment of FIG. 2 is placed the driven shaft 21.

The disclosed device according to FIG. 3 is formed of a driving eccentric geared segment 1 that is located in the axis of rotation $C_1$. The axis of rotation $C_1$ is placed outside of the center of driving eccentric geared segment 1. On the periphery of driving eccentric geared segment 1 is formed of a driving gearing 121 that is formed of driving teeth 121 whose number is $z_1$. The module of driving teeth (cogs) 121 has a value of $m_1$. The driven eccentric geared segment 2 is placed in the axis of rotation $C_2$. The axis of rotation $C_2$ is placed outside of the center of driven eccentric geared segment 2. On the periphery of co-engaged driven eccentric geared segment 2 is formed a driven gearing 22 that is formed of driven teeth (cogs) 221 whose number is $z_2$. The module of driven cogs 221 has a value of $m_2$. The cogs 212 of driving gearing 12 are meshed with driven cogs 221 of the driven gearing 22 while the constant axial distance between the axis of rotation $C_1$ and axis of rotation $C_2$ is a. The module of driving cogs 121 $m_1$ is identical with the module of driven cogs (teeth) 221 that has a value $m_2$. The spacing of driving teeth 121 has a value of $t_1$ is identical with the spacing $t_2$ of driven teeth 221 whose number is $z_2$ and is the same as $z_1$. The center axis $A_1$ of the driving eccentric geared segment 1 is parallel to the center axis $A_2$ of the driven eccentric geared segment 2. The spacing of center axis $A_1$ and the axis of rotation $C_1$ is the eccentricity $e_1$ that is identical with the eccentricity $e_2$ that is the spacing of center axis $A_2$ and axis of rotation $C_2$. The spacing radius $r_1$ of the driving eccentric geared segment 1 is changed based on the angle of turning (rotation) â and the spacing radius r2 of the driven eccentric geared segment 2 is changed based on the angle of turning (rotation).

For the given parameters are valid the following dependences:

The minimum spacing radius $$r=a-a/2-e,$$

while the eccentricity $$e=\cos o/2.a/2$$

and at the same time it has to be preserved that $$n+r2=a$$

As an example of industrial applicability, in addition to transmissions and differentials and by no means is intended to limit the disclosed device herein, the disclosed device can be utilized on the cog wheel fixed to the bicycle pedal that adjusts to a torque of best efficiency at the most efficient utilization of cyclist s torque. Another option for the utilization of technical solution is the use in combustion engines where it may be used to replace the crankshaft by an eccentric geared segment while there are meshed always the same cogs.

While all of the fundamental characteristics and features of the present invention have been described herein, with reference to particular embodiments thereof, a latitude of modification, various changes and substitutions are intended in the foregoing disclosure and it will be apparent that in some instance, some features of the invention will be employed without a corresponding use of other features without departing from the scope of the invention as set forth. It should be understood that such substitutions, modifications, and variations may be made by those skilled in the art without departing from the spirit or scope of the invention. Consequently, all such substitutions, modifications and variations are intended to be included within the scope of the invention herein disclosed and described.

What is claimed is:

1. The geared segments with variable gear (drive) ratio are aimed for use mainly in mechanical machines, motors and pumps where a variable gear ratio during one revolution is required comprising: a driving shaft and driven shaft having a constant axial distance therebetween, said driving shaft (11) providing an axis of rotation for a driving eccentric geared segment (1) engaged thereon, said driving eccentric geared segment having a driving gearing (12) that is formed of at least three driving cogs (121) from which at least one is meshed with at least one driven cog (221) of an external driven gearing (22) that is formed on the periphery of a co-engaged (meshed) driven eccentric geared segment (2), said driven eccentric geared segment (2) engaged upon said driven shaft (21), said driven shaft providing an axis for rotation for said driven eccentric geared segment.

2. The geared segment with variable gear ratio according to claim 1, wherein the number of cogs (121) of the driving eccentric geared segment (1) is identical with the number of cogs (221) of the driven eccentric geared segment (2).

3. The geared segments with variable gear ratio according to claim 1 which are characteristic by the fact that the axis of rotation of the driving shaft (11) is moved outside of the center axis of the driving eccentric geared segment (1) and the axis of rotation of driven shaft (21) is moved outside of the center axis of driven eccentric geared segment (2).

4. The geared segments with variable gear ratio according to claim 2 which are characteristic by the fact that the axis of rotation of the driving shaft (11) is moved outside of the center axis of the driving eccentric geared segment (1) and the axis of rotation of driven shaft (21) is moved outside of the center axis of driven eccentric geared segment (2).

* * * * *